United States Patent [19]

Saimi et al.

[11] Patent Number: 5,175,717
[45] Date of Patent: Dec. 29, 1992

[54] OPTICAL HEAD HAVING A FIXED OPTICAL CASING AND A MOVABLE OPTICAL CASING

[75] Inventors: Tetsuo Saimi; Kazuo Momoo, both of Hirakata; Shoji Gotoh, Nara, all of Japan

[73] Assignee: Matsushita Electric Industrial Co., Ltd., Osaka, Japan

[21] Appl. No.: 793,164

[22] Filed: Nov. 18, 1991

[30] Foreign Application Priority Data

Nov. 20, 1990 [JP] Japan ................................ 2-317252

[51] Int. Cl.⁵ .............................................. G11B 7/00
[52] U.S. Cl. ............................ 369/44.14; 369/44.11; 359/507; 359/513
[58] Field of Search ............... 369/44.14, 44.11, 44.15, 369/44.16, 44.17, 44.18, 44.19, 44.21, 44.22, 44.23, 44.24; 359/507, 511, 513, 737, 813, 894

[56] References Cited

U.S. PATENT DOCUMENTS

| | | | |
|---|---|---|---|
| 4,959,824 | 9/1990 | Ueda et al. | 369/44.14 |
| 4,991,949 | 2/1991 | Moorehead | 359/507 |
| 5,018,033 | 5/1991 | Miyazaki et al. | 360/106 |
| 5,023,858 | 6/1991 | Nakayama | 369/111 |

FOREIGN PATENT DOCUMENTS 62-25319  6/1987  Japan ................................. 359/507

*Primary Examiner*—Aristotelis Psitos
*Assistant Examiner*—P. W. Huber
*Attorney, Agent, or Firm*—Wenderoth, Lind & Ponack

[57] ABSTRACT

An optical head comprises a fixed optical casing and a movable optical casing accommodating a deflecting mirror and an objective lens which moves separately from the deflecting mirror. Windows are inserted in the boundary between the interior and exterior of an optical path to cover a light-exposed area of an optical system so as to prevent dust from entering into the optical casings. Each window is simple in its construction and makes a slight angle with a plane perpendicular to the optical axis of the optical system so that the windows do not become dusty. Each window can be coated with a conductive thin film which is grounded through a conductive area of each optical casing.

2 Claims, 3 Drawing Sheets

OPTICAL HEAD HAVING A FIXED OPTICAL CASING AND A MOVABLE OPTICAL CASING

BACKGROUND OF THE INVENTION

The present invention relates to an optical head for recording data on an optical disk, reproducing the data recorded thereon, or erasing the data therefrom.

According to a conventional optical disk device, an optical pickup for reading a signal comprises a casing accommodating: a semiconductor laser serving as a light source; an optical system for making laser beams parallel with each other; a beam splitter; a beam deflecting mirror; and an objective lens and the like. FIG. 3 is a schematic view showing such a conventional optical pickup. Optical beams emitted by a semiconductor laser 1 are made to be parallel with each other by a collimating lens 2 and incident on a beam splitter 3. The optical beams which have been corrected in astigmatism by the beam splitter 3 are deflected toward an optical disk 6 by a beam deflecting mirror 4, thus being incident on the objective lens 5. The optical beams converged by the objective lens 5 are reflected by the optical disk 6 and return along the same optical path and are reflected by the beam splitter 3, thus being incident on optical detectors 10 and 11. Since the operation of an optical detecting system 12 is known, the detailed description thereof is omitted. Since the optical system of the above-described optical pickup is accommodated in one casing, the optical system does not become dusty or dirty, but the optical pickup is heavy. Consequently, it takes a long time to move the optical pickup with respect to the optical disk, so that high speed access cannot be accomplished.

In a known separable type optical head, namely, in an optical head in which the deflecting mirror 4 and the objective lens 5 move separately from each other, the optical head is light and high speed access is possible while the optical system becomes dusty or dirty because it is substantially exposed to the outside.

SUMMARY OF THE INVENTION

Accordingly, an object of the present invention is to provide an optical head in which a deflecting mirror and an objective lens move separately from a fixed optical casing.

In accomplishing these and other objects, according to one embodiment of the present invention, there is provided an optical head comprising:

a fixed optical casing accommodating a collimating system for making optical beams emitted by a radiating light source parallel with each other and an optical system for transmitting the optical beams therethrough or branching the optical beams;

a movable optical casing accommodating a mirror for receiving the optical beams which have passed through the fixed optical casing and deflecting the optical beams toward an optical information recording medium and an objective lens for converging the optical beams on the optical information recording medium;

a first substantially parallel transparent plate mounted on a beam passing opening of the fixed optical casing; and a second substantially parallel transparent plate mounted on a beam passing opening of the movable optical casing so that the first and second transparent plates are approximately perpendicular to the optical beams.

According to a second embodiment of the present invention, there is provided the optical head in which the pair of transparent plates made of the same material and having the same thickness make the same angle of 0.1°–3° with a plane perpendicular to the optical beams in such a manner that the transparent plates incline in opposite directions with respect to the plane.

According to a third embodiment of the present invention, there is provided the optical head in which the transparent plates are coated with a conductive dielectric film which is grounded through a conductive area of the fixed and movable optical casings.

According to the above construction, dust is prevented from entering into the fixed and movable optical casings by the transparent plates mounted thereon and made of, for example glass. Therefore, the optical system accommodated in the fixed optical casing is protected from dust. The transparent plates are approximately perpendicular to the optical beams so that the plates do not become dusty.

The simple construction of the transparent plates facilitates the removal of dust which has become attached thereto.

The transparent plates make a small angle with respect to the plane in opposite directions. Accordingly, aberrations in the optical path and the movement of the optical axis can be avoided.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
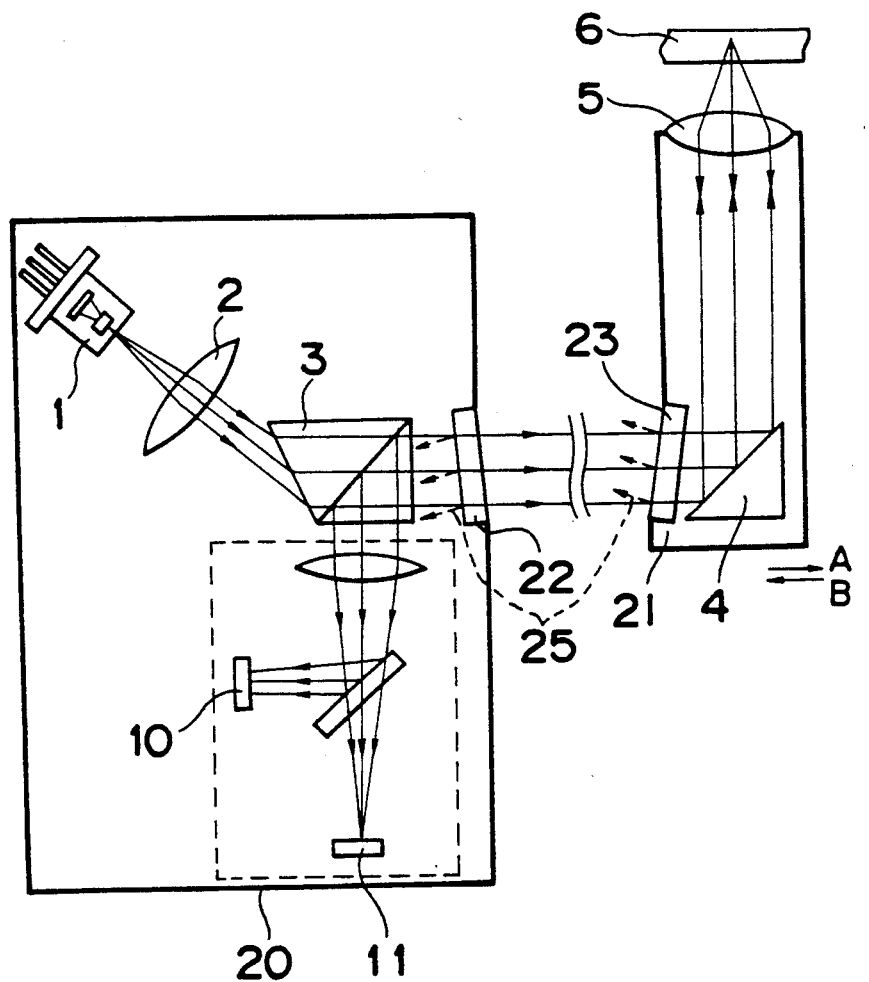
FIG. 1 is a schematic view showing an optical head according to a first embodiment of the present invention.

Before the description of the present invention proceeds, it is to be noted that like parts are designated by like reference numerals throughout the accompanying drawings.

A first embodiment of the present invention will be described below with reference to FIG. 1 which is a schematic view showing an optical head. The construction of the optical system is similar to that of the conventional optical head except that the optical system comprises a fixed optical casing 20 and a movable optical casing 21 with a beam splitter 3 accommodated in the fixed optical casing 20 and a deflecting mirror 4 accommodated in the movable optical casing 21. The movable optical casing 21 is movable to cover the stroke of the optical disk 6 in the radial direction thereof. Since the optical system can be operated by a known means, the detailed description thereof is omitted. According to the embodiment, the tracking servomechanism utilizes a push-pull method and the focusing servomechanism utilizes a astigmatic detection method. The descriptions of other optical instruments employed in the first embodiment are omitted because they are not essential to the present invention.

The present invention is applicable to reproduction; recording and reproduction; and recording, reproduction, and erasing; as well as optical magnetic systems; phase change systems; and hole burning systems. The fixed optical casing 20 and the movable optical casing 21 are provided with transparent windows 22 and 23, serving as a first and second substantially parallel transparent plates, at the entrance/exit of light beams so as to prevent dust from entering into the optical system. The windows 22 and 23 are made of a transparent material such as glass in substantially in parallel or a little wedged and coated with a film, respectively, for preventing light beams from being reflected by the windows 22 and 23. A window approximately perpendicular to the optical axis is advantageous for manufacturing both casings 20 and 21. But unless the film coating the window has a function of sufficiently preventing the reflection of optical beams, optical beams 25 reflected by the surface of the window enter into the detecting optical system, thus affecting an appropriate detection of signals outputted from the servomechanisms. The capability of an ordinary reflection preventing film is not more than 0.5 to 1% in consideration of the fluctuation of a wavelength. If light beams have passed through the film having a capability of not more than 0.5%, the light beams return to the optical detector without being corrected. As a result, the light beams may cause the focusing servomechanism to improperly focus or the tracking servomechanism to improperly track. In order to prevent light beams reflected by the windows 22 and 23 from being incident on the optical detectors 10 and 11, the windows 22 and 23 are positioned on the fixed optical casing 20 and the movable optical casing 21, respectively, so that they make a small angle with a plane perpendicular to the optical axis. The windows 22 and 23 made of the same material and having the same thickness preferably make the same angle of 0.1°-3° with a plane perpendicular to the optical beams in such a manner that the windows 22 and 23 incline in opposite directions with respect to the plane. Although the angles to be made by the windows 22 and 23 with the optical axis are set to be a little different from each other according to the design of the detecting optical system, it is essential that light beams reflected by the surface of the window are not incident on the optical detectors 10 and 11. For example, supposing that the focal length of an optical detecting lens is 30mm and the dimension of the respective optical detectors 10 and 11 is 1×1 mm, preferably, each of the windows 22 and 23 make an angle not less than approximately 0.5° with a plane perpendicular to the optical axis. Thus, undesired light beams can be prevented from being incident on the optical detectors 10 and 11.

As shown in FIG. 1, in order to correct aberrations, the windows 22 and 23 make an angle with the plane perpendicular to the optical axis in the same degree but toward opposite directions. Thus, there is no deterioration of the optical system in its function and a clear optical spot can be obtained because the parallel movement of optical beams in the optical path between the windows 22 and 23 can be corrected.

The window 22 can prevent dust from entering the fixed the optical casing 20. Therefore, optical system accommodated in the fixed optical casing 20 is protected from dust. In the movable optical casing 21, since the objective lens 5 moves in the focusing direction or the tracking direction, a slight gap is unavoidably generated between the upper wall of the movable optical casing 21 and the objective lens 5. That is, although the window 23 of the movable optical casing 21 seals out dust, dust can enter into the movable optical casing 21 through the above-described slight gap to some extent. As such, dust can be prevented from piling on the deflecting mirror 4 to a great extent by the window 23. The windows 22 and 23 are respectively coated with the reflection preventing film which is sufficiently hard. Therefore, dust which has piled on the windows 22 and 23 can be removed with a nonwoven cloth.

Figure 2:
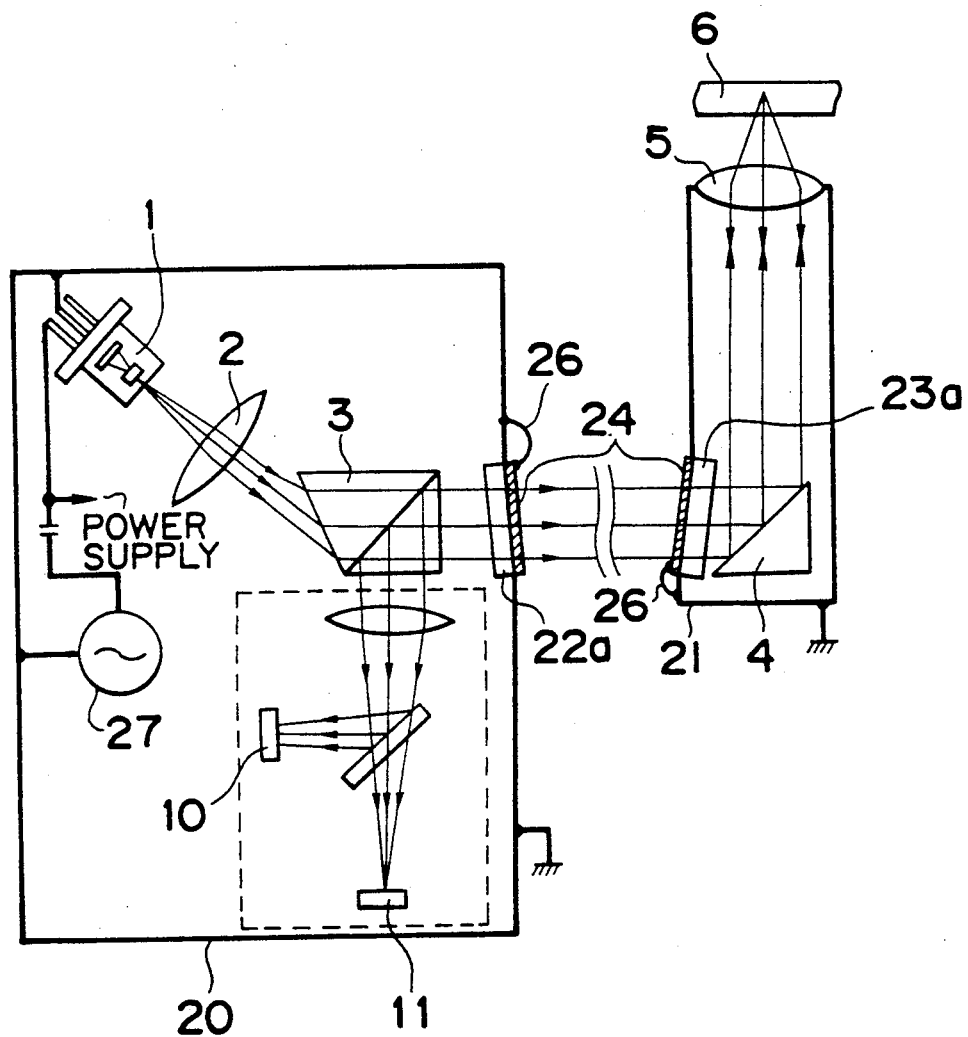
FIG. 2 is a schematic view showing an optical head according to a second embodiment.
Figure 3:
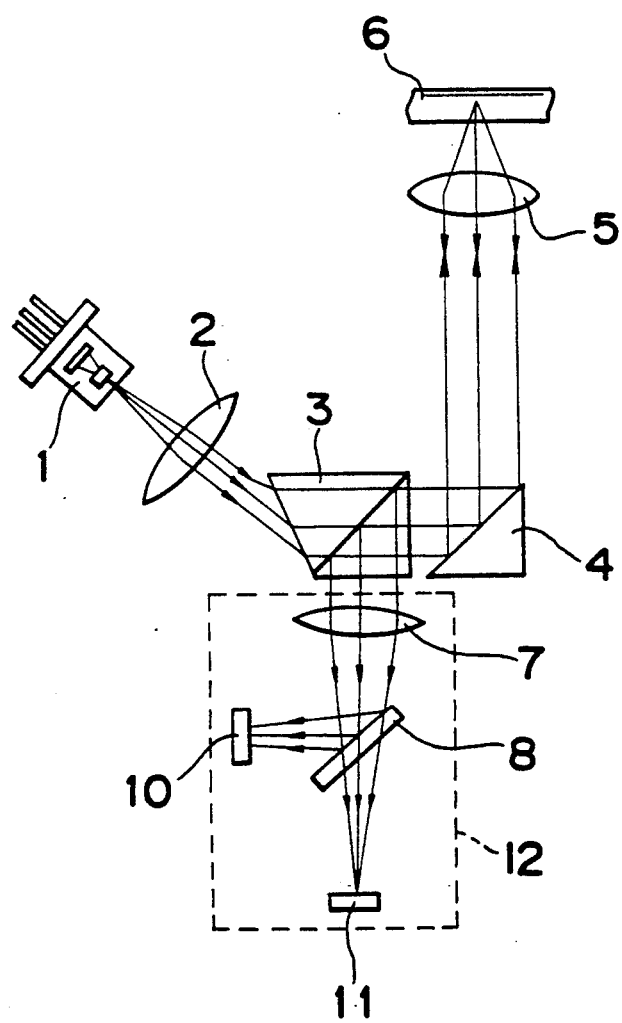
FIG. 3 is a schematic view showing a conventional optical head.

A second embodiment of the present invention is described below with reference to FIG. 2. The optical system of the second embodiment is the same as that of the first embodiment in its construction except that the windows 22 and 23 are coated with a transparent conductive thin film 24, respectively. In the second embodiment, an ITO film is used as the material of the transparent conductive thin film 24. One end of each transparent conductive thin film 24 is electrically grounded via a conductive area of the fixed optical casing 20 and the movable optical casing 21, respectively. Since the windows 22 and 23 are coated with the transparent conductive thin film 24, the electric charge of conductive dust which has collected on the windows 22 and 23 is electrically grounded through the transparent conductive thin film 24. Accordingly, conductive dust does not collect on the windows 22 and 23. The sealing of the fixed optical casing 20 from dust with the conductive material reduces the amount of undesired radiation which is caused by the superimposition by means 27 of high frequencies of 30–800 MHz carried out to improve C/N of laser beams in the fixed optical casing 20. The technique of high frequency superimposition is known and various devices have been made to set the level of an unnecessary radiation to be less than a certain level. For example, a shield casing accommodating a high frequency superimposition circuit is soldered for electrically grounding into a casing accommodating an optical head. Since the optical head of the embodiment is of a separable type, there is much leakage of undesired radiation from the front of the fixed optical casing 20 which is open. Therefore, shielding the front of the fixed optical casing 20 by means of the conductive material reduces the leakage amount of undesired radiation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical head comprising:
   a fixed optical casing accommodating a collimating system for making optical beams emitted by a radiating light source parallel with each other and an optical system for transmitting the optical beams therethrough or branching the optical beams;
   a movable optical casing accommodating a mirror for receiving the optical beams which have passed through the fixed optical casing and deflecting the optical beams toward an optical information recording medium and an objective lens for converging the optical beams onto the optical information recording medium;

a first substantially parallel transparent plate mounted at a beam passing opening of the fixed optical casing;

a second substantially parallel transparent plate mounted at a beam passing opening of the movable optical casing so that the first and second transparent plates are approximately perpendicular to the optical beams; and wherein the first and second transparent plate made of the same material and having the same thickness make the same angle of 0.1°–3° with a plane perpendicular to the optical beams in such a manner that the transparent plates incline in opposite directions with respect to the plane.

2. An optical head comprising:

a fixed optical casing accommodating a collimating system for making optical beams emitted by a radiating light source parallel with each other and an optical system for transmitting the optical beams therethrough or branching the optical beams;

a movable optical casing accommodating a mirror for receiving the optical beams which have passed through the fixed optical casing and deflecting the optical beams toward an optical information recording medium and an objective lens for converging the optical beams onto the optical information recording medium;

a first substantially parallel transparent plate mounted at a beam passing opening of the fixed optical casing;

a second substantially parallel transparent plate mounted at a beam passing opening of the movable optical casing so that the first and second transparent plates are approximately perpendicular to the optical beams; and wherein the transparent plates are each coated with a conductive dielectric film which is grounded through conductive areas of the fixed optical casing and the movable optical casing, respectively.

* * * * *